Aug. 19, 1969  W. E. SANDERS ETAL  3,461,818
HINGED HOPPER AND GONDOLA CAR ROOF
Filed Dec. 21, 1967  3 Sheets-Sheet 1
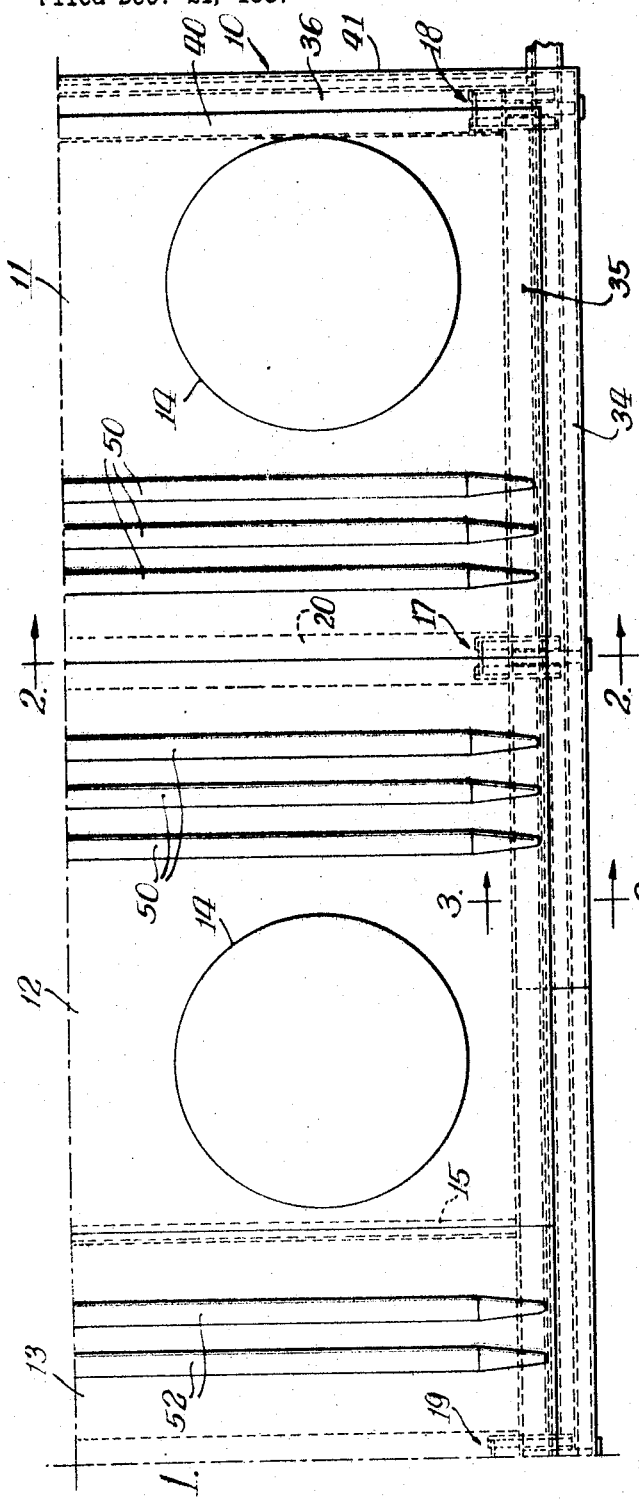
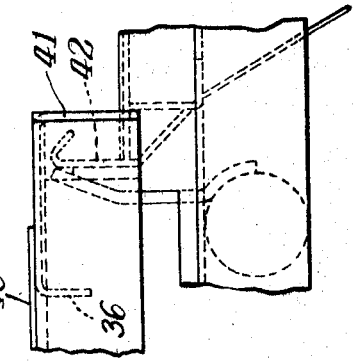
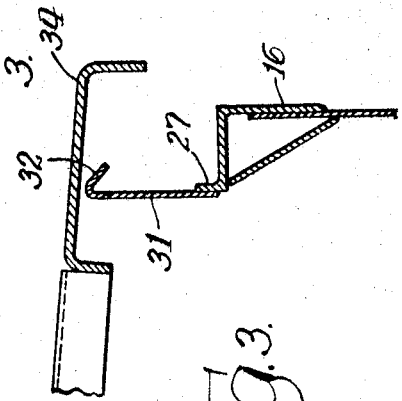
Inventors:-
Wes E. Sanders,
John W. Allen.
By Sabin C. Bronson Atty.

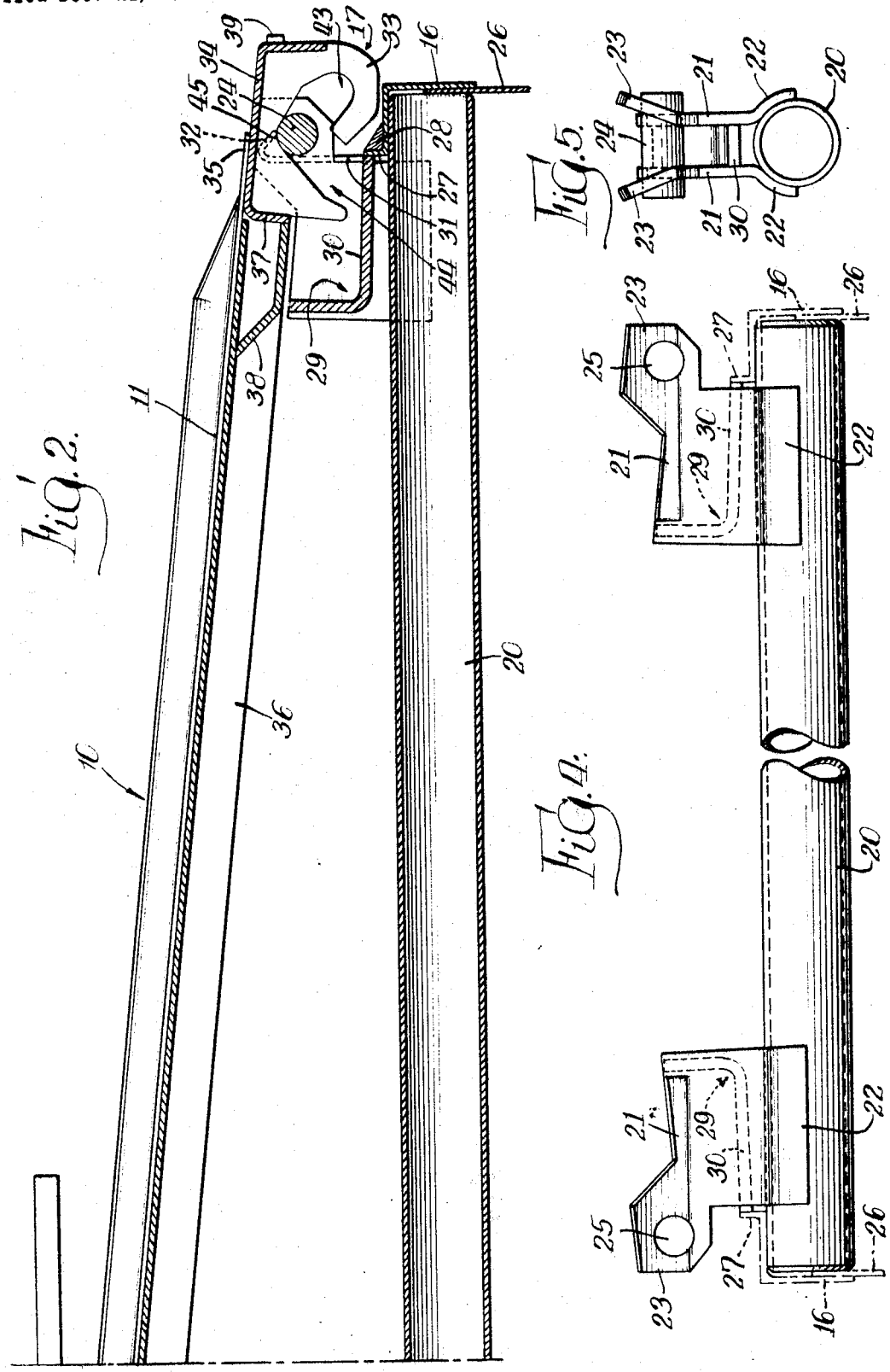

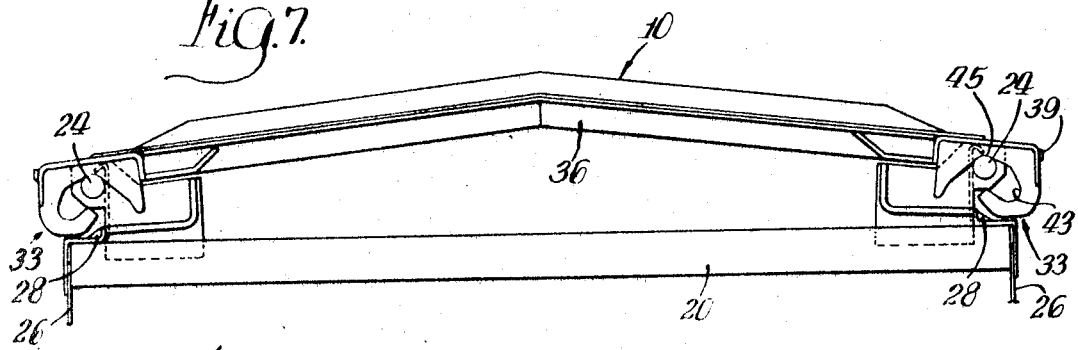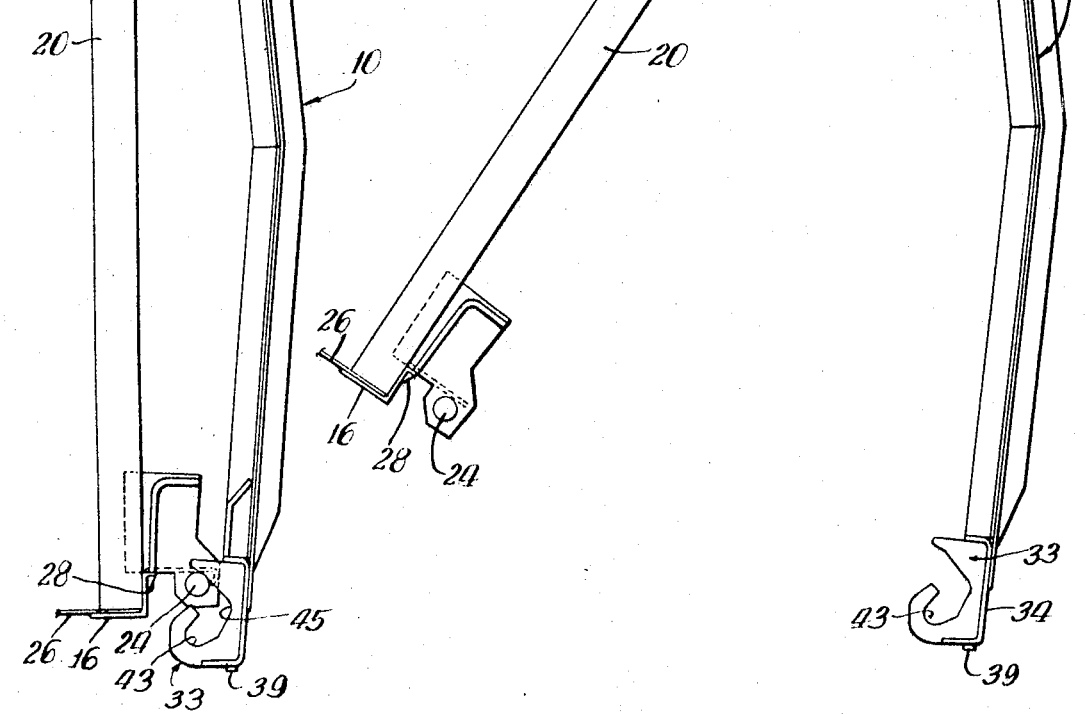

United States Patent Office 3,461,818
Patented Aug. 19, 1969

3,461,818
HINGED HOPPER AND GONDOLA CAR ROOF
Wes E. Sanders, Chicago, and John W. Allen, Flossmoor, Ill., assignors to Stanray Corporation, Chicago, Ill., a corporation of Delaware
Filed Dec. 21, 1967, Ser. No. 692,375
Int. Cl. B61d 39/00, 3/00, 7/00
U.S. Cl. 105—377
9 Claims

ABSTRACT OF THE DISCLOSURE

A roof for an open top railroad freight car, which roof is movably and hingedly mounted along the longitudinal side edges thereof to the tops of side walls of the car. The hinge arrangements are such that the roof is carried in a normal position to completely cover the interior of the car when the car is in an upright position. However, when the car is rotated about its longitudinal axis in a rotating car dumper, the roof is pivoted about the upper side edge of the car and swings away from the lower side edge thereof so that the car contents can be dumped through the top of the car. The roof can be pivoted about either side edge of the car so that the car can be run through a dumper in either direction and dumped to either side. After the dumping operation, the car is rotated in a reverse direction and the roof swings back to engagement with the hinge at the lower side edge of the car.

Summary of the invention

At the present time gondola and covered hopper cars can be loaded through hatches in the roofs or covers on the cars and are unloaded through bottom or side hatches in the cars. The present invention provides a roof structure which is permanently attached to the car but is also swingably mounted about the tops of the longitudinal side edges of the car. The mounting means includes a plurality of hinge arrangements with pins mounted on the top of the side edges of the car body and associated hook members mounted on the side edges of the roof structure.

The hooks on both sides of the roof are shaped so that when the roof is disposed horizontally, as in a normal upright position of the car, the hooks rest on the pins in such a manner that the roof completely covers the opening into the car and is locked to the car. However, as a car is swung from its normal position to a dumping position, as in a car dumper, a position is reached at somewhat less than 90° from the horizontal closed position when the roof moves laterally causing the hooks at the lower side edge of the car to disengage from their associated pins, unlocking that side of roof from car and the roof swings open about pivot points provided at the hooks and pins of the upper side edge of the car. As the roof swings open, the contents of the car can then be dumped by further rotation of the car in the dumper. The hinge arrangements are such that when the roof swings away from the car a minimum of 15°, it is again automatically locked on the car to prevent the roof from becoming disengaged and dropping into the dumping pit.

After the dumping operation the car can be rotated in a reverse direction in the dumper and at the position which was previously mentioned as being a position where the roof swings open, the hooks will re-engage with their associated pins to secure the lower side edge of the roof to the side edge of the car. Upon further rotation of the car to a final upright position, the car roof settles on its hooks to a rest position on the pins to completely cover the interior of the car and automatically locking the roof to the car.

Brief description of the drawings

FIGURE 1 is a top plan view of a quarter of the integral roof structure as terminating at the longitudinal and transverse center lines thereof.

FIGURE 2 is a cross section on the line 2—2 of FIGURE 1.

FIGURE 3 is a cross section on the line 3—3 of FIGURE 1.

FIGURE 4 is a side view of part of the hinge asembly on the body of the car.

FIGURE 5 is an end view of the hinge assembly as shown in FIGURE 4.

FIGURE 6 is a side view of a corner of the car roof shown in FIGURE 1.

FIGURE 7 is an end view showing the roof of the car in normal position on an upright car.

FIGURE 8 is an end view of the roof and car as it appears when the car has been rotated approximately 90° in a clockwise direction.

FIGURE 9 is an end view showing the roof and car position after the car has been rotated approximately 125° from its horizontal position as seen in FIGURE 7.

Description of the preferred embodiment

In the drawings the reference numeral 10 generally indicates a railway car roof, a quarter portion of which is shown in FIGURE 1. It will be understood that the rest of the roof, which is not shown, is symmetrical about the transverse and longitudinal center lines of the car and is formed integrally with the portion shown in FIGURE 1. In the complete roof there are two hatch sheets at each end of the roof and a central middle roof sheet is disposed between the pairs of hatch sheets. In the quarter portion shown, the hatch sheets are indicated at 11 and 12 and one-half of the central middle roof sheet is indicated at 13. Hatches 14 are shown in the hatch sheets, and although shown as being circular in form, they may be of any shape desired or a trough hatch type. Hatches 14 are at opposite ends of the hatch sheets 11 and 12, and adjacent a side edge thereof. Adjacent the other edge thereof where welded to the other hatch sheet, there are a plurality of parallel corrugations 50 pressed upwardly from the plane of the sheet, and which extend across the roof from side to side thereof but which taper in depth and width at the ends thereof and merge into the plane of the sheet adjacent the eaves ends of the sheets. It will be noted that the sheets 11 and 12 are reversed as applied to the car; in other words, the corrugations 50 in each sheet are adjacent the welded-together edges of the sheets.

Similarly, the center roof sheet 13 is provided with a plurality of corrugations 52 identical to the corrugations 50, there being at least a pair of the corrugations 52 adjacent each side edge of the center room sheet.

These corrugations 50 and 52 function as outside carlines to the roof from eaves to eaves thereof, and of course, in addition to their primary function, the hatches 14 and covers therefor add considerable stability to the roof.

The hatch sheets and the middle roof sheet are welded together along their respective meeting edges to form the integral roof that is designed to cover the top opening of the car on which it is carried. Such roof fabrication is well known and will not be described in detail as it forms no part of the invention. Carlines 15 are shown disposed along the meeting edges of the hatch sheets and the middle roof sheet in a customary manner.

Turning for the moment to FIGURE 2 of the drawings, the portion 10 of the roof is shown supported along one edge thereof on the side plate 16 of a car body by means of a hinge arrangement generally indicated at 17.

This hinge arrangement will be described in detail later. However, as the view of FIGURE 2 shows only one-half of the roof as extending transversely across the car body, it should be appreciated that an identical hinge arrangement supports the opposite side edge of the roof on the other side plate of the car. There are shown five such pairs of hinge arrangements longitudinally spaced along the length of the car roof and the car body although obviously more or less of the hinge arrangements could be used. In FIGURE 1 of the drawings the hinge arrangement at the end of the roof sheet is generally indicated at 18 while the hinge arrangement 17 is shown as lying at the meeting edge of the hatch sheets 11 and 12. There is also a hinge arrangement at the medial line of the central middle roof sheet 13, and this is generally indicated at 19.

Attention is now directed to FIGURES 4 and 5 which show a portion of the hinge arrangement which is supported on the car body. As seen in these figures, a metal tube 20 carries pairs of pin support members 21—21 at each end thereof. The manner of securing the pin support members 21—21 on metal tube 20 is best shown in FIGURE 5, and it can be observed that each of these members has a curved portion 22—22 which fits around and is secured, as by welding, to the tube 20. An upper portion, as seen in FIGURE 5, of the pin support members is shown outwardly bent as at 23—23 and a pin 24 extends through and is secured in openings 25—25 in the pin support members 21—21.

The pin and pin support members as carried on the tube 20 are positioned within the car body, as seen in FIGURE 2, by welding the ends of the tube 20 to the side plates 16—16 of the car body. As thus positioned, the ends of the tube 20 lie within the lower confines of the Z-shaped side plate members 16—16.

The construction at each of the hinge arrangements includes a longitudinally extending hinge lock member for the side plates, and this is indicated at 28. This member is a half round metal piece which is suitably welded to the upstanding flange 27 and the horizontal intermediate portion of the side plate.

In order to make each hinge arrangement as weatherproof as possible and to prevent water from entering the interior of the car through the hinge arrangements when the roof is in place, as seen in FIGURE 2, a trough generally indicated at 29, formed of an L-shaped metal plate, is secured by welding to the two pin support members 21—21 and to the upright flange 27 of the side plate member 16. As can be observed, the horizontal leg 30 of the trough is slightly inclined downward to facilitate a drain-off of water.

In addition to the trough 29 there is also provided a rain deflector plate 31 which is shown in FIGURES 2 and 3 as being welded to the upstanding flange 27 of side plate 16 and to the pin support members 21—21 and extended upward to a bent down portion 32. The plates 31 are secured between the hinge arrangements to prevent water from entering into the interior of the car through the spaces that exist between the hinge arrangements 17–18 and 17–19.

The roof construction, which includes means for positioning the hooks that are generally indicated by the reference numeral 33, will now be further described. As seen in FIGURES 1–3, inclusive, of the drawings, downwardly facing channel-shaped hook support members 34 are disposed to underlie and be welded to the extreme side edges of the roof sheets making up the integral roof 10. As best seen in FIGURE 2, a side margin of the hatch sheet 11 is indicated at 35 to illustrate this positioning.

The hooks 33 are secured at their appropriate locations within the hook support members 34. Disposed between each pair of hooks 33 on the opposite sides of the roof, there are downwardly turned channel-shaped hook separator members 36 that extend transversely across the roof and are upwardly inclined to immediately underlie an associated roof sheet. For example, one of the hook separator members 36 is shown as being under the roof sheet 11.

Each hook separator 36 abuts against and is welded to the inner legs 37 of the hook support members 34 on either side of the roof at the location of the pairs of hooks 33—33. Channel gussets 38 are secured to the ends of the separators 36 to strengthen the separators in the vicinity of the hooks and also act as a weather hood over trough 29. Stop blocks 39 are welded to the outer leg of each channel hook support member 34 at the location of each hook 33.

To complete the description of the roof 10, attention is now directed to FIGURE 6 wherein an end margin 40 of roof sheet 11 is shown overlying and secured to the hook separator member 36, as by welding. Each end of the roof 10 is closed by a suitable end plate 41 extending transversely across the full width of the roof and being secured to the longitudinally disposed support members 34 and an adjacent hook separator member 36. A hook-shaped rain deflector 42 is secured across the car body at each end of the roof to lie within the roof when the roof is in normal position covering the interior of the car.

Hooks 33 are of solid metal block construction and in the model now being tested are 1½ inches wide. As can be best seen in FIGURE 2 of the drawings, the hook is designed to have a recess, generally indicated at 43, and a lateral and offset opening generally indicated at 44. Between the recess and the opening, the hook is formed with a rounded corner as at 45.

For a description of the manner in which the car roof is used, attention is directed to FIGURES 7, 8 and 9 of the drawings. In FIGURE 7 the roof is shown disposed on the car when the car is in a normal running position. As can be seen, the roof is supported on the car by contact between the rounded corners 45 of the hooks 33 and the pins 24 carried on the car body in the manner heretofore described. In this position the car roof completely covers the opening to the interior of the car and is locked against vertical motion.

In FIGURE 8 of the drawings the car has been rotated 90° clockwise from the position shown in FIGURE 7 by means of a car dumper. In this figure it can be observed that under the influence of gravity the roof 10 has slid downwardly on the pin 24 at the upper edge of the car to a position where the pin 24 is in the recess 43. In this position it will be understood that the roof can now pivot about the pin 24. At the same time it will be observed that at the lower hinge arrangement the pin 24 is now positioned away from the rounded corner 45 of the associated hook and is in the opening 44 and thus unlocked from the car.

Now as the car dumper continues to rotate the car clockwise past the position shown in FIGURE 8, the roof 10, pivoted about the upper pin 24 and being freed at its lower end, will swing outwardly in relation to the car body as illustrated in FIGURE 9 of the drawings. The hook 33 will normally stay engaged in recess 43 on the pin 24 as shown in FIGURE 8 as roof opens, since it is hanging on the pin. If an external force should be applied to the roof at stop 39 after it is open 15 degrees, the hook 33 is of such a configuration that it is impossible for the roof to be lifted off the pin 24 and thus become completely disengaged from the car. This provides a safety feature in case the roof should hit some object as it is opening. FIGURE 9 illustrates the configuration of the hook 34 and block 28 showing that the hook cannot be removed from the pin unless the roof nears the closed position. The stop 39 also prevents the roof from opening more than a specified amount to prevent undue swinging.

As the car is being returned from its dumping position to a nomal running position by action of the car dumper, it should be apparent that the sequence of roof opening, as described above, will be reversed and that the roof will come to a position illustrated in FIGURE 8 of the drawings and to a final rest position as shown in FIGURE 7 of the drawings when the car is returned to the normal running position, with the roof locked to the car.

While the description of the preferred embodiment of the invention has been directed to an arrangement wherein the hooks of the hinge arrangements are attached at the roof and the pins of the hinges are connected to the car body, applicant's invention is not limited to this construction. For example, if desirable, it is within the scope of the invention to fabricate the roof with the pins attached thereto and with the hooks attached to the car body.

We claim:

1. A movable roof arrangement for a gondola or covered hopper car or container, including an integral roof structure designed to cover a top opening in said car, said roof structure having a plurality of longitudinally spaced hook members disposed along the side edges of said roof, each of the hooks on said roof structure being associated with pintles mounted along the tops of the sides of said car body, each of said hooks having a recess, and an opening to said recess which is offset and laterally disposed relative thereto, said hooks also having a rounded corner lying between said recess and said opening, said rounded corners being designed to rest on said pins when said roof is generally horizontally disposed on said car body in a first position to close or cover the top opening in said car and locked against relative vertical motion of roof from car, said roof structure being movable laterally by gravity when said car is revolved by power means to a second position less than 90° from said first position, the movement of said roof structure causing said hook members on the side edge of said roof structure which is then higher than the other side edge of said roof structure to occupy a position wherein their associated pins are embracingly received within the recesses of said hooks to thereby form a plurality of aligned pivot points between said roof and the car body, this same roof movement causing the hook members on the then lower edge of said roof to occupy a position wherein the pintles on the lower side edge of said car body lie in the openings in said hooks, and thus unlocking this edge of the roof from the car, and further revolving movement of said car beyond the 90° position causing the roof to swing away from said car body about said plurality of pivot points as the pintles on the lower edge of said body clear their associated hooks.

2. The arrangement as in claim 1 wherein a relatively small further revolving movement of said car causes said roof structure to be locked in engagement with said car body at said pivot points.

3. The arrangement as in claim 2 wherein said relatively small further revolving movement is in the range of approximately 15°.

4. The arrangement as in claim 2, wherein a reverse revolution of said car causes said roof structure to re-engage said car body and close said top opening in said car and lock the roof relative to the car in a series of roof movements which is reverse to that of the roof opening.

5. In a movable roof for a gondola or covered hopper car or container, including a plurality of longitudinally disposed hooks on the side edges of said roof, said hooks being selectively engageable with associated pins mounted on the tops of the side walls of the car body, a first section in each of said hooks resting directly upon an associated pin to position said roof in such a manner that a top opening into said car is closed and vertically restrained when the car is in an upright or normal running position, each of said hooks having a recess disposed at one side of said first section and an opening at the opposite side of said first section, a revolving movement of said car about its longitudinal axis to a position less than 90° from the normal running position causing said roof to slide to a position where the hooks on the higher side of the car pivotally embrace their associated pins on the car body and the openings of the hooks on the lower side edge of the roof are aligned with their associated pins on said car body, further revolving movement of said car past the 90° position causing said roof to swing away from the car body about the pivotal points on the higher side of the car to thereby permit dumping of the car contents through said top opening.

6. The movable roof arrangement as in claim 5 wherein a further revolving movement of said car of approximately 15° past the 90° position of said car causes said roof structure to be locked in engagement with said car body at said pivot points.

7. The movable roof arrangement as in claim 6 wherein a reverse revolving movement of said car about its longitudinal axis causes said roof to re-engage said car body and close said top opening in the car in a series of roof movements opposite to that of the roof movements during the roof opening operation.

8. A movable roof structure for an open top railroad freight car or container having side and end plates in a common plane, said roof structure covering the entire car opening defined by said side and end plates, cooperative hooks and pintles of hinge elements secured along the side margins of the roof structure and along said side plates, whereby the roof is hingeable along either side edge, said hinge elements being movable laterally with respect to each other from closed position to open position, whereby a revolving movement of said car in either direction about its longitudinal axis to a position less than 90° from normal running position will cause said roof structure to move laterally so that the hinge elements along the then higher side of the car are cooperatively engaged in closed position, and the hinge elements along the then lower side of the car are in unlocked position, and a further revolving movement of said car beyond the 90° position will cause the roof structure to swing away by gravity from the car body about the cooperative hinge elements on the higher side of the car to permit dumping of the car contents through said top opening.

9. In a vehicle having sides and ends defining a lading space, and a roof for said space hinged along opposite margins to said sides, said hinge means comprising hinge elements secured along said sides, and cooperative hinge elements secured along said roof margins, said hinge elements being formed so as to be movable relative to each other from a locked position along one side to an unlocked position along the other side, whereby, when said vehicle is rotated about 90° in either direction about a longitudinal axis, as in a rotary dumper, the roof will move laterally, locking the hinge elements along one side and unlocking the hinge elements along the other side and when the vehicle is rotated more than 90° the roof will swing on said locked hinge elements and open along said unlocked hinge elements, allowing lading to be dumped from the vehicle.

References Cited

UNITED STATES PATENTS 1,428,448    9/1922    Peck _____ 105—377

ROBERT G. SHERIDAN, Primary Examiner

U.S. Cl. X.R.

105—276, 281; 214—44; 220—32